United States Patent [19]

Khurgin

[11] Patent Number: 4,633,131
[45] Date of Patent: Dec. 30, 1986

[54] HALO-REDUCING FACEPLATE ARRANGEMENT

[75] Inventor: Jacob Khurgin, Croton-on-Hudson, N.Y.

[73] Assignee: North American Philips Corporation, New York, N.Y.

[21] Appl. No.: 680,631

[22] Filed: Dec. 12, 1984

[51] Int. Cl.$^4$ .......................... H01J 29/28; H01J 29/89
[52] U.S. Cl. ..................................... 313/474; 350/163; 358/253
[58] Field of Search .................. 313/461, 474, 478; 358/247, 250, 252, 253, 255; 350/171, 172, 173, 174

[56] References Cited

U.S. PATENT DOCUMENTS 3,902,012  8/1975  Dalton et al. .................. 313/394 X
4,310,783  1/1982  Temple .............................. 313/474

Primary Examiner—Palmer C. DeMeo
Assistant Examiner—K. Wieder
Attorney, Agent, or Firm—Robert J. Kraus

[57] ABSTRACT

A faceplate arrangement for a monochromatic cathode ray tube includes a compound filter disposed between the faceplate and a light scattering luminescent screen. The compound filter includes a multilayer interference edge filter adjacent the screen and a multilayer matching filter adjacent the faceplate. The edge filter reflects back into the screen light rays received from the screen which would contribute to halo, and the matching filter matches the optical admittances of the edge filter and the faceplate.

5 Claims, 3 Drawing Figures

HALO-REDUCING FACEPLATE ARRANGEMENT

BACKGROUND OF THE INVENTION

1. Field of the Invention

This invention relates to a faceplate arrangement for cathode ray tubes, and in particular to a faceplate arrangement including optical filter means for improving the quality of images produced by monochromatic cathode ray tubes having powdered-layer luminescent screens.

2. Description of the Prior Art

Conventional cathode ray tube display systems use either a single display tube or three monochromatic projection tubes. The display tube produces a viewable image at its faceplate. The projection tubes simultaneously project respective red, green and blue images onto a projection screen where they collectively form a viewable polychromatic image. In either type of system, the image contrast is adversely affected by halo. This is an undesirable ring or series of rings surrounding the luminescent image of the tube's scanning electron beam. In projection tube systems the image brightness is also substantially dependent on the angle at which light rays are emitted from the tubes' luminescent screens.

The causes of halo and the angle dependence of image brightness can be seen by referring to FIG. 1, which illustrates a typical prior art faceplate arrangement 10 of a projection tube spaced from a focusing lens 12, both shown in cross-section. The lens 12 magnifies the image formed by light rays received from the faceplate arrangement 10, and projects the image onto a relatively large reflective or transmissive projection screen (not shown).

The arrangement 10 includes a glass faceplate 14, a powdered luminescent screen 16 deposited onto the faceplate, and a reflective layer 18 of an electrically-conductive material such as aluminum. Typical thicknesses for the faceplate, the luminescent screen, and the reflective layer are 10 millimeters, 50 microns and 0.1 microns, respectively. The layer 18 is provided to collect excited electrons from the screen and to reflect toward the faceplate backwardly-directed light rays passing through the screen, thereby increasing the amount of light reaching the lens 12. As is subsequently explained, however, the layer 18 not only increases the amount of useful light reaching the lens 12, but also increases light contributing to halo.

Although FIG. 1 is not drawn to scale, it demonstrates how light rays emitted by the luminescent screen are transmitted through the faceplate arrangement 10. When an electron beam 20 excites the luminescent screen 16 at a spot such as that centered on point 22, a multiplicity of light rays are emitted at different angles. All angles are measured relative to a line 24 originating at the point 22 and passing perpendicularly through a faceplate-screen interface 26 and a faceplate-air interface 28.

All light rays emitted toward the interface 26 are at least partly reflected back into the powdered luminescent screen 16, as rays $I_B$. These rays $I_B$ will be scattered in all directions by the particles in the luminescent screen. Those rays scattered toward the reflective layer 18 will be redirected toward the faceplate 14. The lateral shift between point 22 and any point at which one of these scattered rays is incident at the interface 26 is on the order of the thickness of the luminescent screen itself (e.g. 50 microns) and thus does not substantially increase the diameter of the luminescent electron beam spot, which is typically about 500 microns.

The light rays emitted from point 22 which pass through the faceplate-screen interface 26 reach the faceplate-air interface 28 at the front of the tube. Portions $I_L$ of these rays, emitted from point 22 at angles between 0° and $\theta_{COL}$, pass through interface 28 and are collected by lens 12, ultimately forming the image on the projection system screen. Portions $I_M$ emitted from point 22 at angles greater than $\theta_{COL}$ totally miss the lens, causing decreased image brightness. At least a portion $I_R$ of each ray reaching the interface 28 is reflected back toward the interface 26. The reflected rays $I_R$ reaching the interface 26 are laterally shifted from the point of origin 22 by distances on the order of the faceplate thickness (e.g. 10 millimeters). These laterally-shifted rays are back-scattered by the combination of the powdered luminescent material 16 and the reflective layer 18 and form a number of concentric ring-shaped halos around the image of the electron beam spot, causing decreased image contrast.

U.S. Pat. No. 4,310,784 to Anthon et al. discloses a cathode ray tube faceplate construction for suppressing halo. The construction consists of a clear glass faceplate having an anti-reflection coating on its outside surface and an angle-sensitive thin film interference coating between its inside surface and a phosphor screen. The outside anti-reflection coating is provided to reduce reflection back into the faceplate of luminescent light rays incident thereto at small angles, thereby suppressing a central portion of halo surrounding a luminescent spot. The inside interference coating is provided to reflect luminescent light rays incident thereto at large angles, thereby suppressing a ring-like outer portion of the halo surrounding the central portion.

In principle, an inside interference coating should, by itself, effectively decrease halo and increase brightness. Such a coating should reflect back into the powdered luminescent screen all rays which would otherwise contribute to halo. Some of these reflected rays would be redirected toward the faceplate, increasing image brightness. The coating should operate as a filter having a sharp cutoff, reflecting all rays which significantly contribute to halo (i.e. rays emitted at angles larger than a predetermined angle $\theta_H$), and passing all rays emitted at smaller angles. This angle $\theta_H$ would be selected to meet the design criteria for the particular system in which the tube is used. For example, in a display tube system the angle $\theta_H$ could be made equal to the minimum angle of emitted rays which contribute to the innermost halo ring (typically 45°). In a projection tube system the angle $\theta_H$ could be made equal to the angle $\theta_{COL}$ (typically 25°–30°). Anthon's interference coating, however, produces a gradual increase in reflectivity with angle, reaching only about 60% reflectivity for rays incident at 45° while producing substantial reflectivity even for rays incident at angles between 0° and 30°.

SUMMARY OF THE INVENTION

It is an object of the invention to provide a monochromatic cathode ray tube having a faceplate arrangement including optical filter means which blocks substantially all visually perceptible light radiation incident at angles above $\theta_H$, and which passes substantially all such light radiation incident at angles below $\theta_H$.

It is another object of the invention to provide a monochromatic cathode ray tube having such a faceplate arrangement in which the optical filter means also operates as a band-pass filter. The filter should block all visually perceptible light radiation having wavelengths outside a monochromatic band of light radiation in a bandwidth encompassing the principal wavelength $\lambda_0$ which the tube is intended to produce (e.g. red, green, blue) and extending from a lower wavelength $\lambda_0^-$ to an upper wavelength $\lambda_0^+$.

In accordance with applicant's invention, the above and other objects are achieved by providing a faceplate arrangement including a compound optical filter disposed between the light emitting/scattering screen and the faceplate. The filter includes a first portion adjacent the screen and a second portion adjacent the faceplate. The first portion comprises a multilayer interference edge filter having a cutoff wavelength equal to $\lambda_0^+$ for light rays received from the screen which are perpendicular to the edge filter, and having a cutoff wavelength equal to $\lambda_0^-$ for light rays received from the screen which are incident to the edge filter at angles greater than $\theta_H$. The second portion of the compound filter comprises a multilayer matching filter for matching the optical impedances of the faceplate and the edge filter. The compound filter is highly transmissive for light rays incident at angles between 0° and $\theta_H$ which have wavelengths at or near the principal wavelength $\lambda_0$, and is highly reflective for all other visually perceptible light rays.

In a preferred embodiment the layers of the compound filter are produced by using two different materials having refractive indices $n_1$ and $n_2$, respectively. The edge filter includes a first layer adjacent the screen having the refractive index $n_2$ and a thickness $t_2/2$; an odd number m of layers having alternate refractive indices and thicknesses $n_1$ and $t_1$, $n_2$ and $t_2$, respectively; and a final layer having the refractive index $n_2$ and the thickness $t_2/2$. The matching filter includes a first layer adjacent the final layer of the edge filter having the refractive index $n_2$ and a thickness $t_3/2$, an intermediate layer having the refractive index $n_1$ and a thickness $t_4$, and a final layer adjacent the faceplate having the refractive index $n_2$ and the thickness $t_3/2$. In this embodiment, $n_1$ is larger than $n_2$, $n_1 t_1$ is substantially equal to $n_2 t_2$, and $n_1 t_4$ is substantially equal to $n_2 t_3$.

BRIEF DESCRIPTION OF THE DRAWING

The invention will now be described with reference to a drawing in which.

DESCRIPTION OF THE PREFERRED EMBODIMENT

Figure 1:
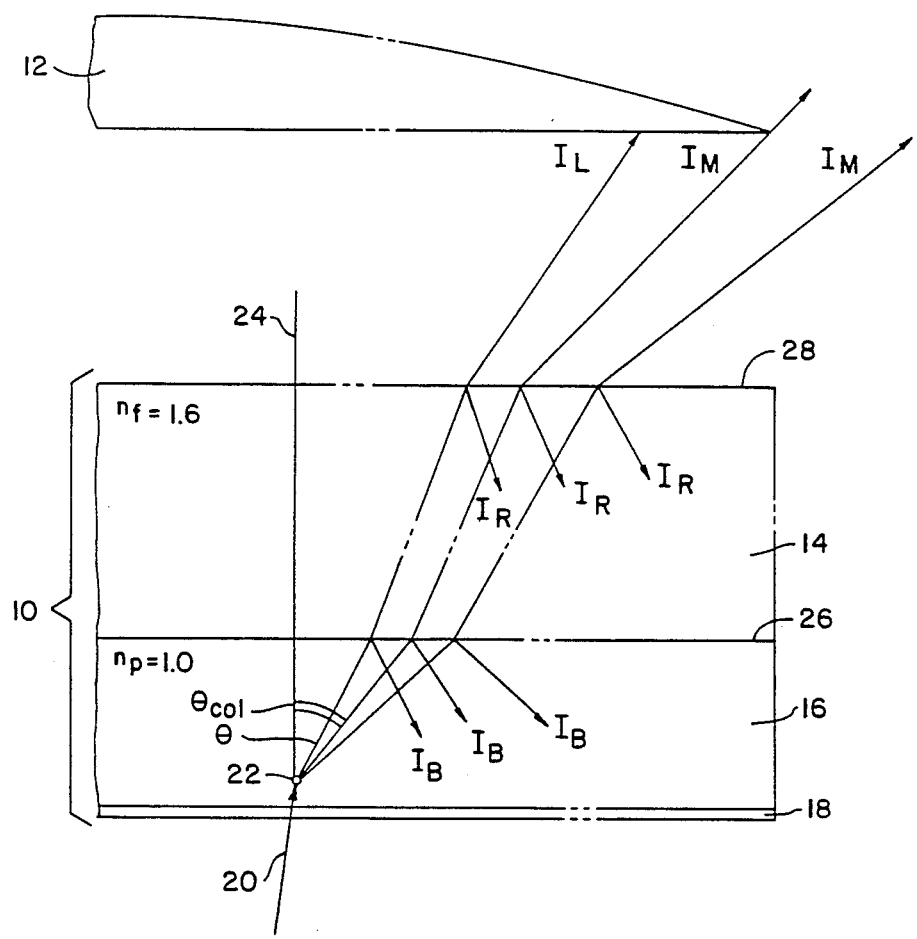
FIG. 1 is a sectional view of one end of a cathode ray tube faceplate and a lens in a projection system employing a prior art cathode ray tube.
Figure 2:
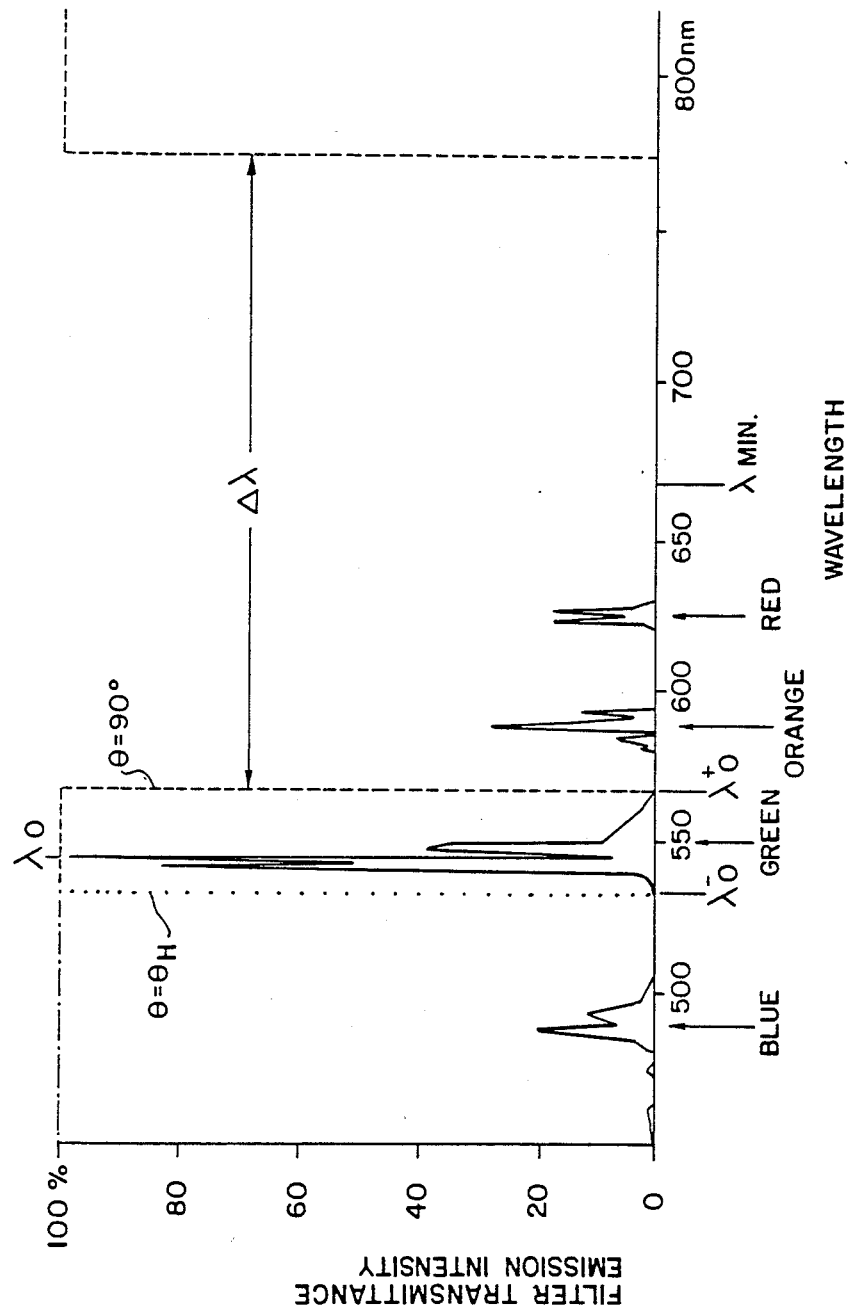
FIG. 2 is a graph illustrating the optical characteristics of a cathode ray tube faceplate in accordance with the invention.

FIG. 2 illustrates both the emission characteristics of a typical luminescent screen and the desired transmittance of the interference edge filter forming the first portion of a filter means in accordance with the invention. The solid lines illustrate the spectral distribution of a high-brightness terbium-doped P44 phosphor material which emits visible light in four distinct bands, including a primary green emission band and three spurious emission bands. The spurious emission bands include a blue sideband to the left of the primary emission band, and orange and red sidebands to the right. The primary emission band has its peak intensity at 544 nanometers ($\lambda_0^-$) and extends from approximately 532 nanometers ($\lambda_0^-$) to approximately 568 nanometers ($\lambda_0^+$).

The dashed/dotted lines illustrate the desired transmittance characteristics of the edge filter. As is illustrated by the dashed line, the edge filter is designed to have a cutoff wavelength of $\lambda_0^+$ for light rays incident to the filter at 90°. As is illustrated by the dotted line, the edge filter is designed to have a cutoff wavelength of $\lambda_0^-$ for light rays incident to the filter at $\theta_H$. Once these parameters are defined for a particular cathode ray tube, design of the specific edge filter can be carried out in a straightforward manner by using standard design formulae such as those set forth in H. A. Macleod, Thin Film Optical Filters, American Elsevier Publishing Company, Inc., New York, (1969) on pages 112-145.

The ideal transmittance characteristics illustrated by the dashed/dotted lines in FIG. 2 cannot be obtained by use of the edge filter alone, but they can be closely approximated by the addition of the multilayer matching filter forming the second portion of the filter means. The matching filter reduces ripple in the transmittance characteristics, which is the major cause of deviation from the illustrated characteristics. This reduction is accomplished by providing a combination of layers having an equivalent admittance which matches the admittance of the edge filter to that of the faceplate material which serves as the supporting substrate for the compound filter. Suitable matching filters are described in the previously mentioned text by Macleod on pages 128-143.

It should be noted that the above-described filter is highly transmissive for light in the spurious blue sideband. This light is not noticeable, however, because of the relatively low energy content of the sideband in comparison to that of the primary green band, and because of the low acuity of the human eye for blue light in comparison to green light. For filters designed to be used with many phosphor materials, the spurious sidebands need not be considered, either because they fall in the rejection band or because no sidebands visible to the human eye are produced. Red light producing europium-doped materials and blue light producing thulium-doped materials are examples of phosphor materials which produce no visible sidebands.

Figure 3:
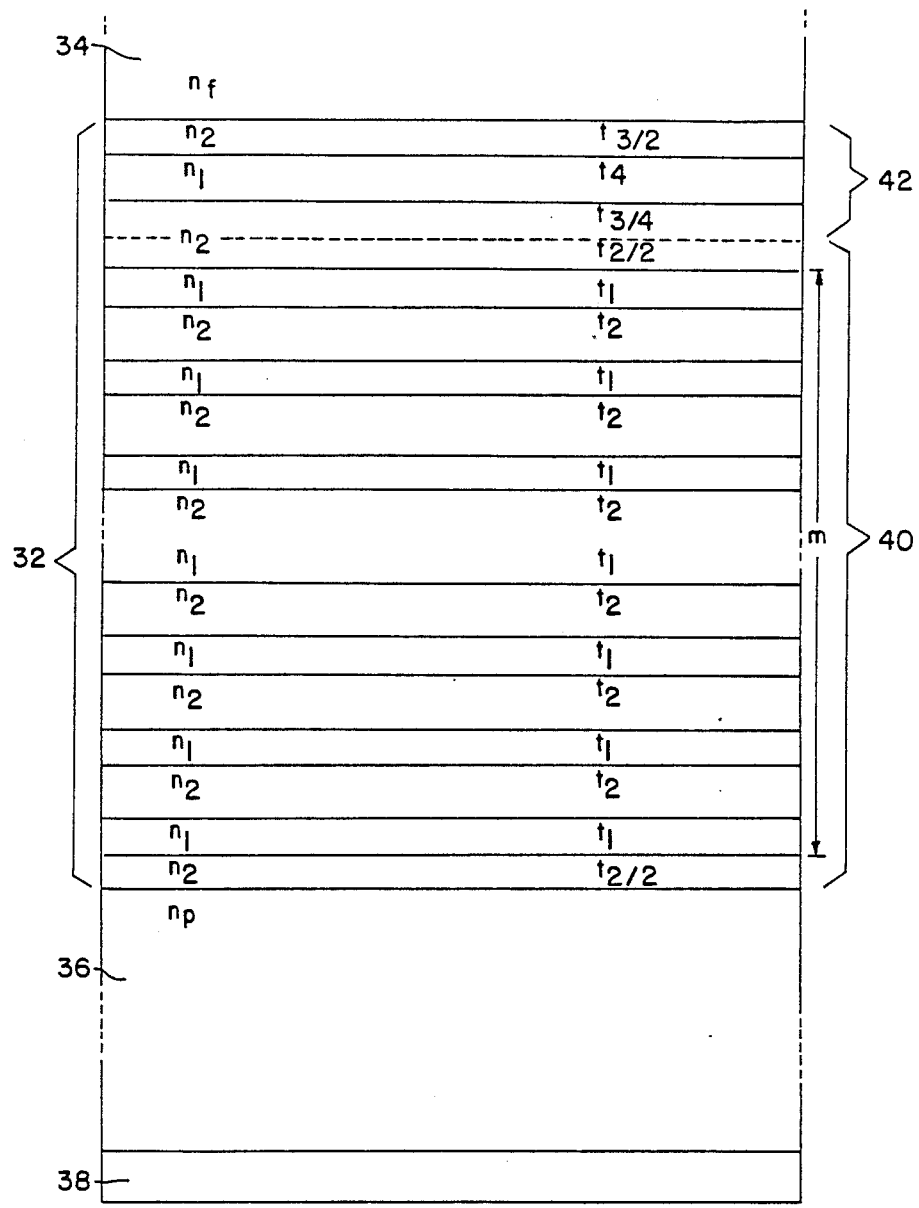
FIG. 3 is a sectional view of one end of a cathode ray tube faceplate arrangement in accordance with the invention.

FIG. 3 illustrates in cross-section an embodiment of a faceplate arrangement including an optical filter means having the above-described cutoff wavelengths at $\lambda_0^-$ (for $\theta = \theta_H$) and at $\lambda_0^+$ (for $\theta = 90°$). The faceplate arrangement includes a compound optical filter 32 deposited on the inner surface of a glass faceplate 34, a screen 36 consisting essentially of terbium-doped P44 green phosphor material deposited on the innermost layer of the filter 32, and a reflective aluminum layer 38 deposited on the inner surface of the screen. The thickness t and the refractive index n of each layer of the filter is indicated in the drawing figure. The refractive indices of the faceplate 34 and the screen 36 are also indicated. The faceplate and screen thicknesses depend on the size of the tube and the energy of the electron beam, but are typically on the order of 10 millimeters and 50 microns, respectively, for a projection tube, or 5-15 millimeters and 10–50 microns, respectively, for a display tube. The thickness of the reflective layer 38 must be sufficiently small to enable penetration by the electron beam, but sufficiently large to conduct the electron beam current away from the screen without overheating. Typically this thickness is about 0.1 micron.

The compound optical filter 32 includes a first portion 40 forming the interference edge filter and a second portion 42 forming the matching filter. The edge filter 40 includes a first layer adjacent the screen 36, an odd number m of intermediate layers, and a final layer adjacent the matching filter 42. The first layer has a refractive index $n_2$ and a thickness $t_2/2$. The m intermediate layers have alternate refractive indices and thicknesses $n_1$ and $t_1$, $n_2$ and $t_2$, respectively. The final layer of the edge filter 40 has the refractive index $n_2$ and the thickness $t_2/2$.

The matching filter 42 has three layers, including a first layer having a thickness $t_3/2$ which is adjacent the final layer of the edge filter. These two layers are indistinguishable from each other, as is indicated in FIG. 3 by a dashed line, because both layers are formed from the same material having the refractive index $n_2$. The second layer of the matching filter has the refractive index $n_1$ and a thickness $t_4$. The final layer of the matching filter is adjacent the faceplate 34 and has the refractive index $n_2$ and the thickness $t_3/2$. The layers in the edge filter and the matching filter also have the following relationships:

$$n_1 > n_2$$

$$n_1 t_1 = n_2 t_2$$

$$n_1 t_4 = n_2 t_3$$

It has been found that the performance of the edge filter can be optimized by setting the product $n_1 t_1 = \frac{1}{4}$ of the wavelength $\lambda_{MIN}$ illustrated in FIG. 2. This wavelength $\lambda_{MIN}$ is the center wavelength of a rejection band of the edge filter which has a lower cutoff wavelength approximately equal to $\lambda_0^+$ and a bandwidth equal to $\Delta\lambda$. The performance of the edge filter can also be optimized by increasing, up to a point, the number m of intermediate layers. Good performance can be obtained with as few as seven intermediate layers, while little improvement in performance is obtained by increasing the number of intermediate layers beyond 15.

A particularly effective faceplate arrangement approximating the transmittance characteristics illustrated in FIG. 2 is produced for a green emitting ($\lambda_0 = 544$ nm) phosphor screen by using the following layer materials and thicknesses for a cathode ray tube having a faceplate with a refractive index $n_f = 1.6$:

$n_1 = 2.35$ (titanium oxide)

$n_2 = 1.45$ (silicon oxide)

$t_1 = 71$ nm $t_2 = 115$ nm $t_3 = 142$ nm $t_4 = 88$ nm

A faceplate arrangement having the above described layer materials and thicknesses, and 15 intermediate layers, closely approaches the transmittance characteristics illustrated in FIG. 2 for $\theta_H = 30°$. Such a filter arrangement reflects 95% of all halo producing light rays in a projection tube system having $\theta_{COL} = 30°$ and increases brightness by a factor of 2.4.

Although the invention has been described with reference to a projection tube embodiment having a particular phosphor material, it may be easily adapted for use with other types of cathode ray tubes, such as display tubes, and with other phosphor materials by adjusting the angle $\theta_H$ and the cutoff wavelengths $\lambda_0^-$, $\lambda_0^+$, illustrated in FIG. 2 for the particular tube of interest. Different materials may also be used to form the filter means such as zinc sulfide (N=2.30), tantalum oxide (n=2.05–2.10) and magnesium fluoride (n=1.38).

I claim:

1. In a monochromatic cathode ray tube having a faceplate arrangement including a faceplate consisting essentially of a transparent material, an internal screen consisting essentially of a light scattering luminescent material for emitting light radiation in a band encompassing a predetermined wavelength $\lambda_0$ and extending from a lower wavelength $\lambda_0^-$ to an upper wavelength $\lambda_0^+$, when excited by an electron beam, and an electrically-conductive reflective layer disposed on an inner surface of the screen, the improvement comprising a compound optical filter disposed between the screen and the faceplate, said optical filter including:
   (a) a first portion comprising a multilayer interference edge filter having a cutoff wavelength of $\lambda_0^+$ for light rays received from the screen which are perpendicular to said edge filter, and having a cutoff wavelength of $\lambda_0^-$ for light rays received from the screen which are incident to said edge filter at angles greater than a predetermined angle $\theta_H$, which light rays would significantly contribute to halo; and
   (b) a second portion comprising a multilayer matching filter for matching the optical impedances of the faceplate and the edge filter.

2. A monochromatic cathod ray tube as in claim 1 where the first portion is adjacent the screen and where the second portion is adjacent the face plate.

3. A monochromatic cathode ray tube as in claim 2 where said edge filter comprises:
   (a) a first layer adjacent the screen having a refractive index $n_2$ and a thickness $t_2/2$;
   (b) an odd number m of layers having alternate refractive indices and thicknesses $n_1$ and $t_1$, $n_2$ and $t_2$, respectively; and
   (c) a final layer having the refractive index $n_2$ and the thickness $t_2/2$;
   where said matching filter comprises:
   (d) a first layer adjacent the final layer of the edge filter having the refractive index $n_2$ and a thickness $t_3/2$;
   (e) an intermediate layer having the refractive index $n_1$ and a thickness $t_4$; and
   (f) a final layer adjacent the faceplate having the refractive index $n_2$ and the thickness $t_3/2$; and where $n_1 > n_2$, $n_1 t_1$ is substantially equal to $n_2 t_2$ and $n_1 t_4$ is substantially equal to $n_2 t_3$.

4. A monochromatic cathode ray tube as in claim 3 where the product $n_1 t_1$ is substantially equal to $\frac{1}{4}$ of a wavelength $\lambda_{MIN}$, which corresponds to the center wavelength of a rejection band of the edge filter having a lower cutoff wavelength approximately equal to $\lambda_0^+$.

5. A monochromatic cathode ray tube as in claim 3 where m is an odd number in the range from 7 through 15.

* * * * *